April 15, 1952   A. M. LE LAN   2,592,812
DEVICE FOR IMPARTING PREDETERMINED CYCLIC DISPLACEMENTS
TO A MACHINE-TOOL MEMBER AND THE LIKE
Filed April 10, 1951
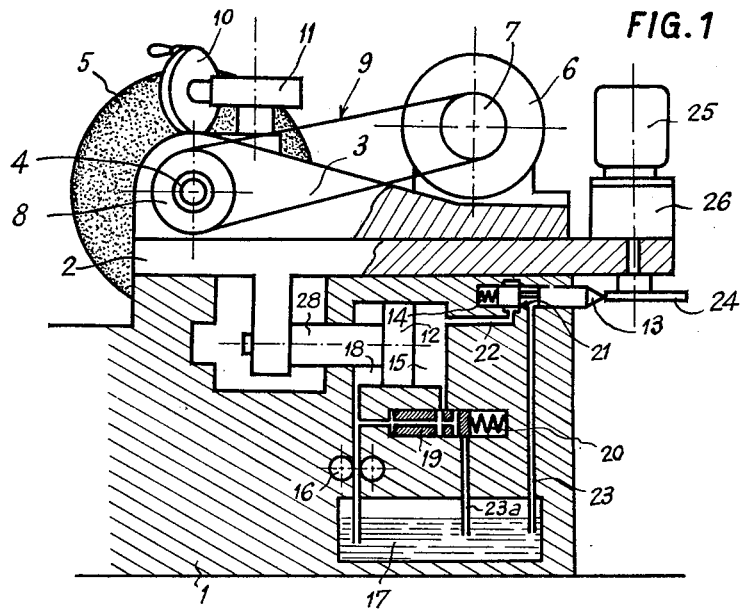
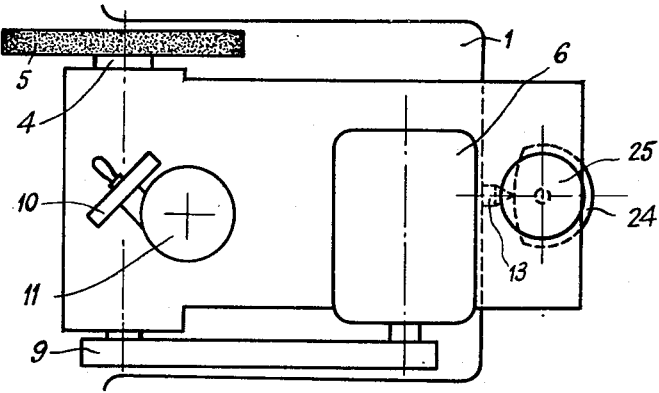
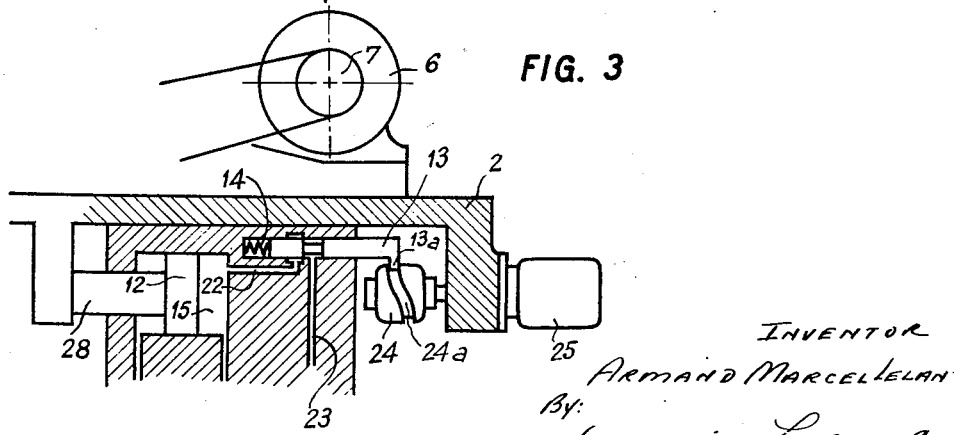
INVENTOR
ARMAND MARCEL LELAN
BY:
Haseltine, Lake & Co.
AGENTS

UNITED STATES PATENT OFFICE 2,592,812

DEVICE FOR IMPARTING PREDETERMINED CYCLIC DISPLACEMENTS TO A MACHINE-TOOL MEMBER AND THE LIKE

Armand Marcel Le Lan, Paris, France, assignor to the Compagnie Generale de Construction de Locomotives (Batignolles-Chatillon), Paris, France, a corporation of France Application April 10, 1951, Serial No. 220,228
In France March 17, 1951

7 Claims. (Cl. 51—165)

This invention relates to the automatic control of the displacements of a movable machine-tool member, e. g. for the obtention of continuous machining cycles.

It is known to equip machine-tools with devices adapted to impart to the tool and/or workpiece carrying members thereof the necessary traverse and feed displacements for producing, sequentially or simultaneously as required, the various machining steps to which the work-pieces are to be subjected.

Such automatic control arrangements when of the mechanically operated type are very accurate at first but are apt within a comparatively short time of service to display an amount of wear inconsistent with desirable accuracy in the position of the parts and hence in the machining. Moreover, the large dimensions that have to be imparted to the control elements in the case of heavy machine-tool carriages to be traversed is an obstacle to the provision of quick displacements as are necessary for the obtention of quick production cycles.

Hydraulically-operated control systems on the other hand are capable, while retaining small dimensions, of displaying all such requisite characteristics as high power, quick motion, and a practically total absence of inertia at the points of reversal in motion. Wear therein is negligible. However, they generally lack accuracy in the positional control of the part, so that it is often necessary to work in positively abutted condition.

It is a general object of this invention to provide a hydraulic control device of the type described in which the position of the movable member to be controlled is controlled with great accuracy without having to maintain the said member in a positively or mechanically abutted condition for obtaining such accuracy.

A further object is the provision of such a control device wherein the position of the movable member is at any instant determined with great precision by a dynamic equilibrium of hydraulic pressures, and in which the movable member will follow instantaneously and accurately the positional variations imparted to it by the predetermined contour of a cam.

A further object is to provide such a device wherein a hydraulic piston is subjected to hydraulic forces which at all times and in all positions of the piston within its cylinder very nearly balance each other, so that a movable member rigid with the piston may be made to follow with great accuracy and smoothness the instantaneous changes in the contour of a cam.

With the above and further objects in view, the invention provides a positional control system in which the displacements are transmitted from a rotary cam having a predetermined contour through a "leak-control" hydraulic mechanism of a type known per se and heretofore used in controlling the displacements of a reproducing tool in accordance with the outline of a part or pattern to be reproduced, and including a feeler which according to the invention is made to co-operate with the said cam.

The invention will now be described by way of example as applied to the positional control of a grinder-wheel carriage in a rectifying machine, wherein the displacements to be automatically produced may be, for example, as follows: rapid approach of the grinder-wheel carriage towards the workpiece, slow downward feed into and through the workpiece, delayed dwell at an accurately determined position; quick return; and so on, thus providing a full uninterrupted working cycle.

According to a feature of the present invention, the cam is journalled in the movable carriage and the feeler is reciprocable within a valve-chamber formed in the frame; all of the hydraulic connections without any exception can thus be provided through ducts formed through fixed parts of the machine frame. In a first embodiment, a cam of the peripheral type is used journalled on an axis transverse to the common direction of displacements of the carriage and the feeler, and having its active periphery engaged by the feeler tip. In a modified construction, the cam is in the form of a cylindrical drum journalled on an axis parallel to said direction of displacement and formed with a cam groove round the cylindrical periphery thereof, and the feeler has a laterally projecting tip or finger engaging the cam groove.

In the accompanying drawings, in which these exemplary embodiments of the invention are illustrated:

Fig. 1 is a side elevational view of a rectifying machine in which the details of the hydraulic device are shown in conventional cross-section;

Fig. 2 is an overhead view of the machine; and

Fig. 3 shows the afore-mentioned modification using a drum-type cam.

Mounted for mutually perpendicular traversing movements on the frame 1 of a rectifier are the superimposed carriages 2 and 3 the upper one 3 of which supports the grinder-wheel spindle 4 having the grinder wheel 5 thereon driven from a motor 6 through a transmission including pulleys 7 and 8 and belt 9.

The lowermost carriage 2 reciprocable relative to the frame 1 in directions parallel to the plane of Fig. 1 and is the movable member to which controlled cyclic displacements are to be imparted according to this invention. The upper carriage 3 is reciprocable relative to the carriage 2 in a direction perpendicular to the plane of Fig. 1 by means of a handwheel 10 and a rack-and-gear mechanism generally designated 11 or any other suitable arrangements quite immaterial to this invention.

Formed in the frame 1 is a cylinder in which a piston 12 is reciprocable in directions parallel to the displacements of carriage 2. The piston 12 is rigidly connected through a large-diameter shank 28 to the carriage 2 and defines within the cylinder two opposite chambers 15 and 18, of which the chamber 18 on the right side of the piston (as shown) is annular owing to the presence of the shank 28 therein so that the effective area of the piston is smaller in this chamber 18 than in the other chamber 15.

Slidable in a valve chamber formed in the frame parallel to the carriage displacements is a member 13 which constitutes a valve member in its part reciprocable in the valve chamber and a feeler member at its outer tip which engages the active periphery of a cam 24 secured on a vertical shaft journalled in the carriage 2 and driven through a reducer 26 from a motor 25 supported on said carriage. The valve-and-feeler member is urged outwards against the cam periphery by a spring 14 in the valve chamber.

In the base of the frame 1 is a hydraulic fluid supply or sump 17. A gear pump 16 draws oil from the supply 17 and delivers it into the annular chamber 18. A branch connection from the pump delivery duct further leads to a valve 19 so biassed by a spring 20 that for a high enough pressure level in the annular chamber 18 a connection is established from the pump delivery through the valve 19 also to the chamber 15. Thus the pressure in the annular chamber tends to be maintained uniform. A relief duct 23a which becomes connected through valve 19 as the piston reaches the end of its stroke leads back into the sump.

The cylinder chamber 15 is connected with the feeler valve chamber through a duct 22 and from the feeler valve chamber a drainage duct 23 through the frame leads back into the sump.

The device operates as follows: With the cam motor 25 idle, the gear pump 16 when started feeds oil first to annular chamber 18 and then, as the pressure in chamber 18 rises and thus urges valve member 19 leftwards to establish connection with the opposite cylinder chamber 15, oil is fed also to this opposite chamber 15. Because the effective or useful area of the piston is substantially larger on its side directed towards this chamber 15 than towards the annular chamber 18, the piston 12 and with it the carriage 2 are moved leftwards. The cam 24 journalled on the carriage of course participates bodily in this movement, and depresses by an amount corresponding to its displacement the feeler-valve 13 into its valve chamber, so that the land or active margin 21 of the valve member uncovers the duct 22, allowing fluid to leak from the cylinder chamber 15 into the sump until the pressure acting on the opposite sides of the piston is equalized. The piston 12 with the structure solid therewith assumes a stationary condition of equilibrium in which the pressures applied to its opposite faces balance each other, this position being such that the valve member 13 normally stands with its land 21 partly sealing the drainage duct 22.

If the cam motor 25 is now started in rotation, the cam 24 starts revolving and actuates the feeler to cause it to move relatively to the carriage-and-piston structure in one or the other direction depending on the particular point of the cam contour under consideration. This will immediately destroy the pressure balance previously set up as just described. Thus, supposing the radius of the cam increases (as is shown in Fig. 2) the feeler 13 is urged inwards, land 21 uncovers a greater area of duct 22, the pressure in chamber 15 decreases, and the piston and carriage are driven rightwards at a rate proportional to the area of port 22 uncovered by land 21. The reverse occurs at those points of the cam contour where the radius decreases. Thus it will be seen that the carriage will at all times follow with great accuracy any instantaneous changes in contour of the cam 24, which may be predetermined to impart any desired cycle of displacements to the carriage. The positional accuracy thus attainable is very high, owing to the feature that the hydraulic forces acting on the piston at all times very nearly balance each other regardless of the particular position of the piston in the cylinder at that time.

In the modification shown in Fig. 3, the cam 24 is a drum cam having a groove 24a formed round it and is journalled in an extension of the carriage for rotation about an axis parallel to the carriage displacements; feeler 13 cooperates with cam groove 24a by means of a laterally-jutting tip or finger 13a.

Many variations may be made in the forms of the invention described and illustrated. In particular, while the duct 22 controlled by land 21 was shown as leading from the chamber 15 associated with the larger effective piston area, the said duct might be made to extend from the annular chamber 18 instead; in such case the cooperation of land 21 with duct 22 would be the reverse from that described, said land acting to seal off a greater area of the duct as the piston is urged in the direction towards the annular chamber.

Many other variations may be made within the scope of the appended claims.

What I claim is:

1. In a machine-tool having a frame member and a movable member to which a predetermined cycle of machining displacements is to be imparted relative to the frame member, a hydraulic cylinder in said frame, a piston connected with the movable member and reciprocable in the cylinder and defining opposite chambers therein, the effective area of the piston being smaller on its side directed towards one chamber than on its side directed towards the opposite chamber, a fluid supply, delivery connections to both chambers and a pump adapted to continually deliver fluid from the supply through the delivery connections to both cylinder chambers, a valve chamber, a pair of cooperating means including a revolving cam means and a feeler means engaging said cam, said cam means mounted for rotation on one of said members and said feeler means mounted for axial displacement relatively to said other member in directions parallel to said machining displacements, drainage connections from a first one of said opposite cylinder chambers to said valve chamber and thence to said fluid supply, a valve body integral with the feeler means and reciprocable in said valve chamber in axial directions parallel to said machining displacements, spring means urging said valve-and-feeler means against the cam, and land means on the valve body adapted gradually to uncover said drainage connection when the valve-and-feeler means is displaced relatively to its associated member in the direction from said first cylinder chamber towards the other chamber, and vice-versa.

2. In a machine-tool having a frame member and a movable member to which a predetermined cycle of machining displacements is to be imparted relatively to the frame member, a hydraulic cylinder in said frame, a piston connected with the movable member and reciprocable in the cylinder and defining opposite cylinder chambers therein, the effective area of the piston on one side being smaller than on the other side, a fluid supply in the frame, delivery connections to both chambers and a pump adapted to continually deliver fluid through the delivery connections to both cylinder chambers, a valve chamber in said frame, a cam means journalled on the movable member and a feeler means engaging the periphery of the cam and a valve body integral with the feeler means and axially reciprocable in said valve chamber in directions parallel to said machining displacements, drainage connections from a first one of said cylinder chambers to the valve chamber and thence to the fluid supply, spring means urging the valve-and-feeler means against the action of the cam, and a land on the valve body adapted gradually to uncover the drainage connection when said valve-and-feeler means is displaced relatively to the frame in the direction from said first cylinder chamber towards the other chamber and vice versa.

3. In a machine-tool having a frame and a movable member to which a predetermined cycle of machining displacements is to be imparted, a hydraulic cylinder in the frame, a piston connected with the movable member and reciprocable in the cylinder and defining a first and a second cylinder chamber therein, the effective area of the piston being smaller on its side directed towards said second chamber than on its side directed towards the first chamber, a fluid supply in the frame, delivery connections from the supply to both cylinder chambers, a pump adapted to continually deliver fluid from the supply through the delivery connections to said cylinder chambers, a valve chamber in the frame, a cam journalled on the movable member and a feeler engaging the periphery of the cam and having a valve body integral with it reciprocable in said valve chamber in directions parallel to said machining displacements, drainage connections from said first cylinder chamber to the valve chamber and thence to the fluid supply, spring means urging the valve-and-feeler against the action of the cam, and a land on the valve body adapted gradually to uncover the drainage connection when the valve-and-feeler is displaced relatively to the frame in the direction from said first cylinder chamber to the second cylinder chamber.

4. The combination claimed in claim 3 wherein said cam is journalled on a vertical axis on said movable member and has an active camming periphery and the feeler has an active tip engaging said periphery.

5. The combination claimed in claim 3 wherein said cam is a cylindrical cam journalled on a horizontal axis on an appendage depending from said movable member and has a cam slot formed around its cylindrical surface and the feeler has a vertically-projecting finger engaging said cam groove.

6. The combination claimed in claim 3 wherein said cam is mounted on a shaft extending through and journalled in a part of said movable member and an individual motor supported on said part of the side therefrom opposite from the cam and driving said shaft.

7. The combination claimed in claim 3 which further comprises a by-pass valve interposed in said delivery connection leading to said first cylinder chamber, and spring means biassing said by-pass valve to open the said delivery connection as the pressure in said second chamber has reached a predetermined level.

ARMAND MARCEL LE LAN.

REFERENCES CITED

The following references are of record in the file of this patent:

UNITED STATES PATENTS

| Number | Name | Date |
| --- | --- | --- |
| 1,961,089 | Smith et al. | May 29, 1934 |
| 2,147,891 | Graf et al. | Feb. 21, 1939 |
| 2,387,075 | Johnson | Oct. 16, 1945 |